United States Patent
Tait et al.

(10) Patent No.: US 9,803,967 B2
(45) Date of Patent: *Oct. 31, 2017

(54) ULTRA-PORTABLE ARTICULATED ARM COORDINATE MEASUREMENT MACHINE

(71) Applicant: Hexagon Metrology, Inc., North Kingstown, RI (US)

(72) Inventors: Hogar Tait, Temecula, CA (US); Paul Ferrari, Carlsbad, CA (US)

(73) Assignee: HEXAGON METROLOGY, INC., North Kingston, RI (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/860,182

(22) Filed: Sep. 21, 2015

(65) Prior Publication Data

US 2016/0131469 A1    May 12, 2016

Related U.S. Application Data

(63) Continuation of application No. 14/133,365, filed on Dec. 18, 2013, now Pat. No. 9,163,921.

(51) Int. Cl.
*G01B 5/008* (2006.01)
*G01B 11/00* (2006.01)

(52) U.S. Cl.
CPC ............ *G01B 5/008* (2013.01); *G01B 11/005* (2013.01); *G01B 2210/58* (2013.01)

(58) Field of Classification Search
CPC ......... G01B 5/004; G01B 5/008; G01B 21/04
USPC .......................................................... 33/503
See application file for complete search history.

(56) References Cited

U.S. PATENT DOCUMENTS

| | | |
|---|---|---|
| 4,492,036 A | 1/1985 | Beckwith |
| 4,972,090 A | 11/1990 | Eaton |
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,251,156 A | 10/1993 | Heier et al. |
| 5,396,712 A | 3/1995 | Herzog |
| 5,408,754 A | 4/1995 | Raab |
| 5,412,880 A | 5/1995 | Raab |

(Continued)

FOREIGN PATENT DOCUMENTS

| | | |
|---|---|---|
| DE | 4345091 | 7/1995 |
| DE | 10112977 | 11/2002 |

(Continued)

*Primary Examiner* — G. Bradley Bennett
(74) *Attorney, Agent, or Firm* — Knobbe, Martens, Olson & Bear, LLP

(57) ABSTRACT

In some embodiments, an articulated arm coordinate measurement machine can include a plurality of transfer members and a plurality of articulation members connecting the plurality of transfer members to each other to measure an angle between the transfer members. The machine can additionally include at least one coordinate acquisition member positioned at an end of the articulated arm. Further, the machine can include a harness connected to at least one of the group consisting of the transfer members and the articulation members to support at least a portion of the weight of the transfer members and the articulation members. The harness can also be configured to mount to a human.

23 Claims, 14 Drawing Sheets

(56) References Cited

U.S. PATENT DOCUMENTS

| | | |
|---|---|---|
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,794,356 A | 8/1998 | Raab |
| 5,822,450 A | 10/1998 | Arakawa et al. |
| 5,829,148 A | 11/1998 | Eaton |
| 5,978,748 A | 11/1999 | Raab |
| 5,991,704 A | 11/1999 | Rekar et al. |
| 6,131,299 A | 10/2000 | Raab et al. |
| 6,134,506 A | 10/2000 | Rosenberg et al. |
| 6,151,789 A | 11/2000 | Raab |
| 6,161,079 A | 12/2000 | Zink et al. |
| 6,166,811 A | 12/2000 | Long et al. |
| 6,219,928 B1 | 4/2001 | Raab et al. |
| 6,366,831 B1 | 4/2002 | Raab |
| 6,430,828 B1 | 8/2002 | Ulbrich |
| 6,487,896 B1 | 12/2002 | Dall'Aglio |
| 6,526,670 B1 | 3/2003 | Carli |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,668,466 B1 | 12/2003 | Bieg et al. |
| 6,759,648 B2 | 7/2004 | Baxter et al. |
| 6,817,108 B2 | 11/2004 | Eaton |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,069,664 B2 | 7/2006 | Raab et al. |
| 7,073,271 B2 | 7/2006 | Raab et al. |
| 7,096,077 B2 | 8/2006 | Price et al. |
| 7,152,456 B2 | 12/2006 | Eaton |
| 7,174,651 B2 | 2/2007 | Raab et al. |
| 7,269,910 B2 | 9/2007 | Raab et al. |
| 7,296,364 B2 | 11/2007 | Seitz et al. |
| 7,296,979 B2 | 11/2007 | Raab et al. |
| 7,372,581 B2 | 5/2008 | Raab et al. |
| 7,395,606 B2 | 7/2008 | Crampton |
| 7,441,341 B2 | 10/2008 | Eaton |
| 7,525,276 B2 | 4/2009 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,624,510 B2 | 12/2009 | Ferrari |
| 7,640,674 B2 | 1/2010 | Ferrari et al. |
| 7,676,945 B2 | 3/2010 | Prestidge et al. |
| 7,693,325 B2 | 4/2010 | Pulla et al. |
| 7,743,524 B2 | 6/2010 | Eaton et al. |
| 7,774,949 B2 | 8/2010 | Ferrari |
| 7,779,548 B2 | 8/2010 | Ferrari |
| 7,784,194 B2 | 8/2010 | Raab et al. |
| 7,797,849 B2 | 9/2010 | Gomez |
| 7,805,854 B2 | 10/2010 | Eaton |
| 7,908,757 B2 | 3/2011 | Ferrari |
| 7,984,558 B2 | 7/2011 | Ferrari |
| D643,319 S | 8/2011 | Ferrari et al. |
| 8,001,697 B2 | 8/2011 | Danielson et al. |
| 8,015,721 B2 | 9/2011 | Eaton et al. |
| 8,082,673 B2 | 12/2011 | Desforges et al. |
| 8,099,877 B2 | 1/2012 | Champ |
| 8,104,189 B2 | 1/2012 | Tait |
| 8,112,896 B2 | 2/2012 | Ferrari et al. |
| 8,122,610 B2 | 2/2012 | Tait et al. |
| 8,123,350 B2 | 2/2012 | Cannell et al. |
| 8,127,458 B1 | 3/2012 | Ferrari |
| 8,145,446 B2 | 3/2012 | Atwell et al. |
| 8,151,477 B2 | 4/2012 | Tait |
| 8,176,646 B2 | 5/2012 | Ferrari |
| 8,201,341 B2 | 6/2012 | Ferrari |
| 8,220,173 B2 | 7/2012 | Tait |
| 8,229,208 B2 | 7/2012 | Pulla et al. |
| 8,327,555 B2 | 12/2012 | Champ |
| 8,336,220 B2 | 12/2012 | Eaton et al. |
| 8,402,669 B2 | 3/2013 | Ferrari et al. |
| 8,497,901 B2 | 7/2013 | Pettersson |
| 9,594,250 B2 * | 3/2017 | Tait .......... G02B 27/017 |
| 2001/0034947 A1 | 11/2001 | Nagata |
| 2002/0100884 A1 | 8/2002 | Maddock |
| 2008/0016711 A1 | 1/2008 | Baebler |
| 2008/0127501 A1 * | 6/2008 | Eaton ............ G01B 21/047 33/503 |
| 2008/0271332 A1 * | 11/2008 | Jordil ............ G01B 5/008 33/503 |
| 2009/0013548 A1 | 1/2009 | Ferrari |
| 2010/0208062 A1 * | 8/2010 | Pettersson ....... G01B 21/04 348/140 |
| 2011/0112786 A1 | 5/2011 | Desforges et al. |
| 2011/0170534 A1 | 7/2011 | York |
| 2011/0175745 A1 | 7/2011 | Atwell et al. |
| 2011/0213247 A1 | 9/2011 | Shammas |
| 2014/0046589 A1 | 2/2014 | Metzler et al. |
| 2014/0156218 A1 | 6/2014 | Kim et al. |

FOREIGN PATENT DOCUMENTS

| | | |
|---|---|---|
| EP | 0522610 | 1/1993 |
| FR | 2740546 | 4/1997 |
| GB | 2274526 | 7/1994 |
| JP | 05/031685 | 2/1993 |
| JP | 2003/021133 | 1/2003 |
| JP | 2003/175484 | 6/2003 |
| WO | WO 98/08050 | 2/1998 |

* cited by examiner

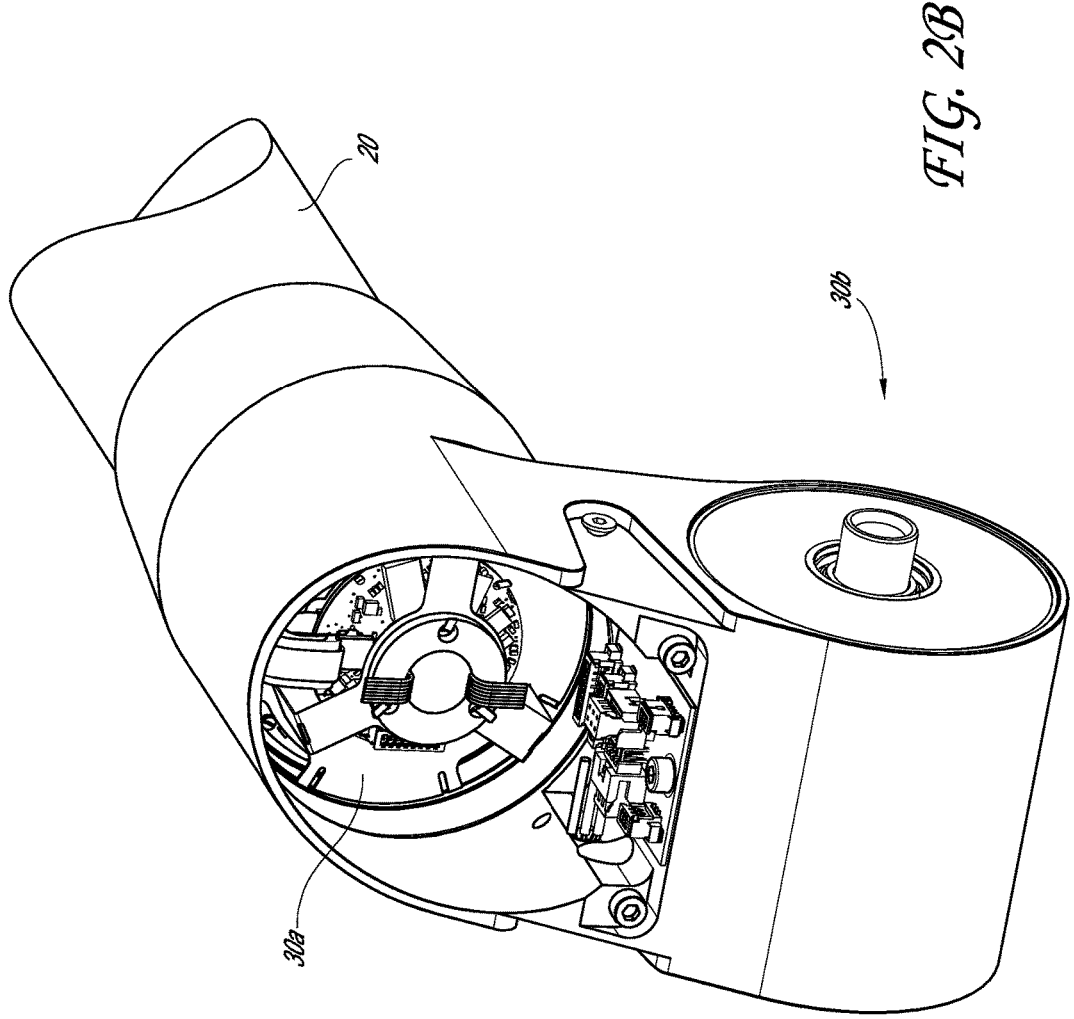

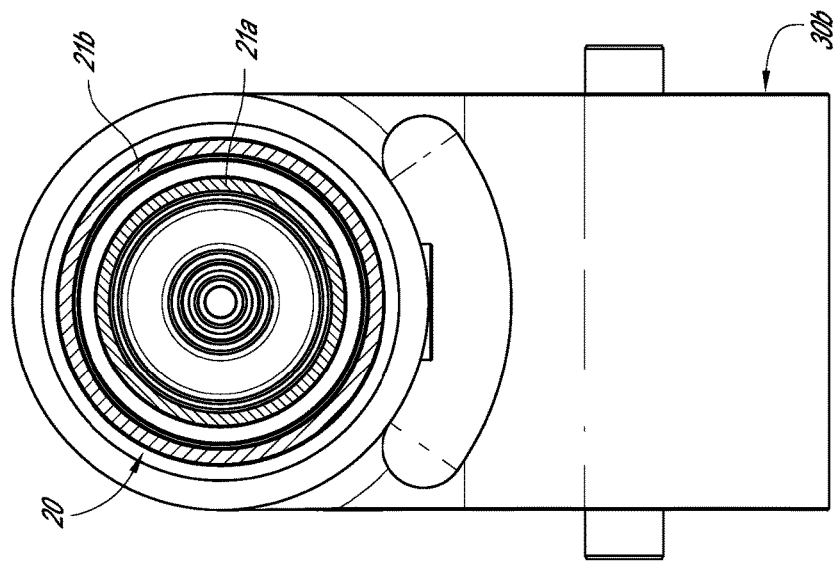
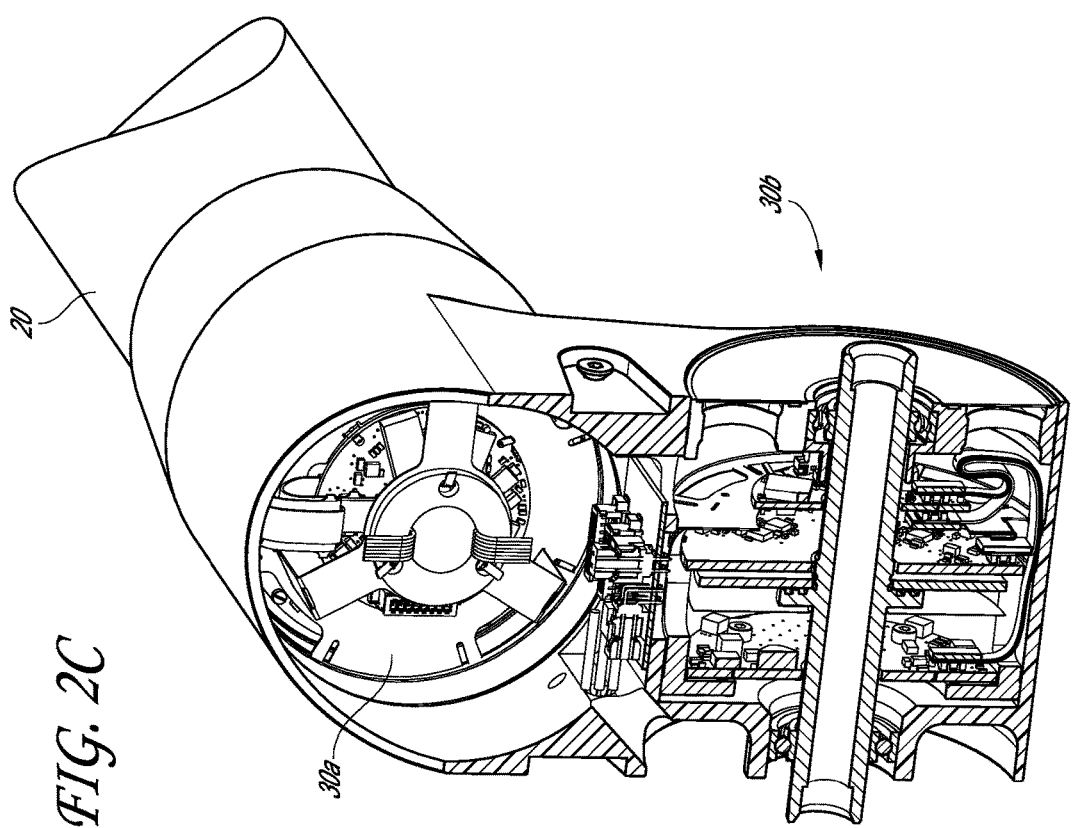
FIG. 2C
FIG. 2D

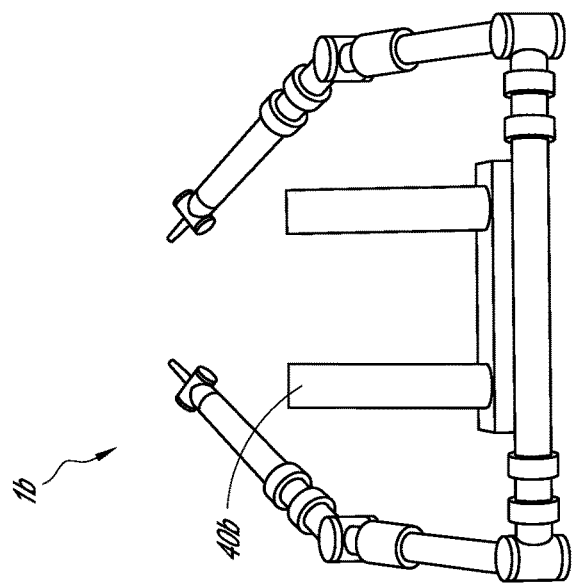
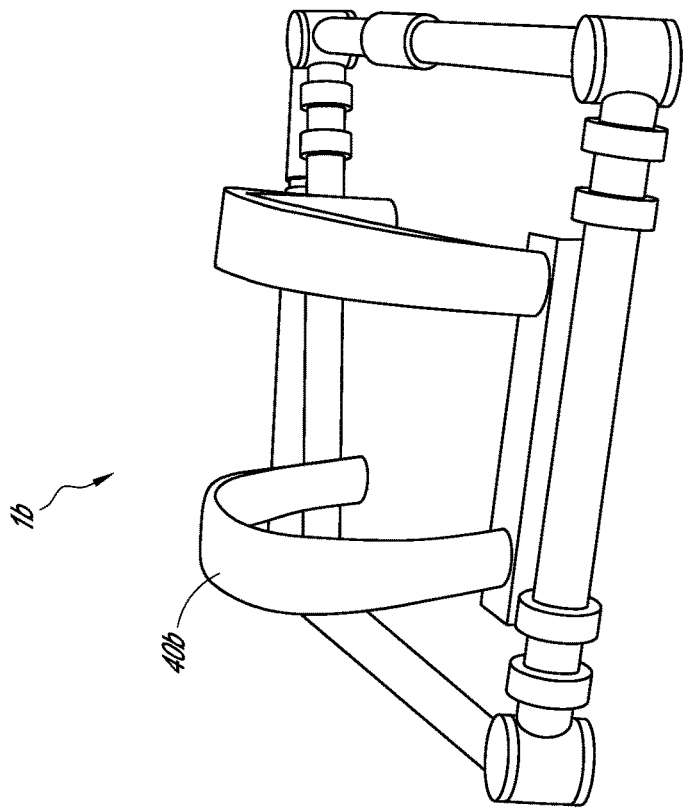
FIG. 4

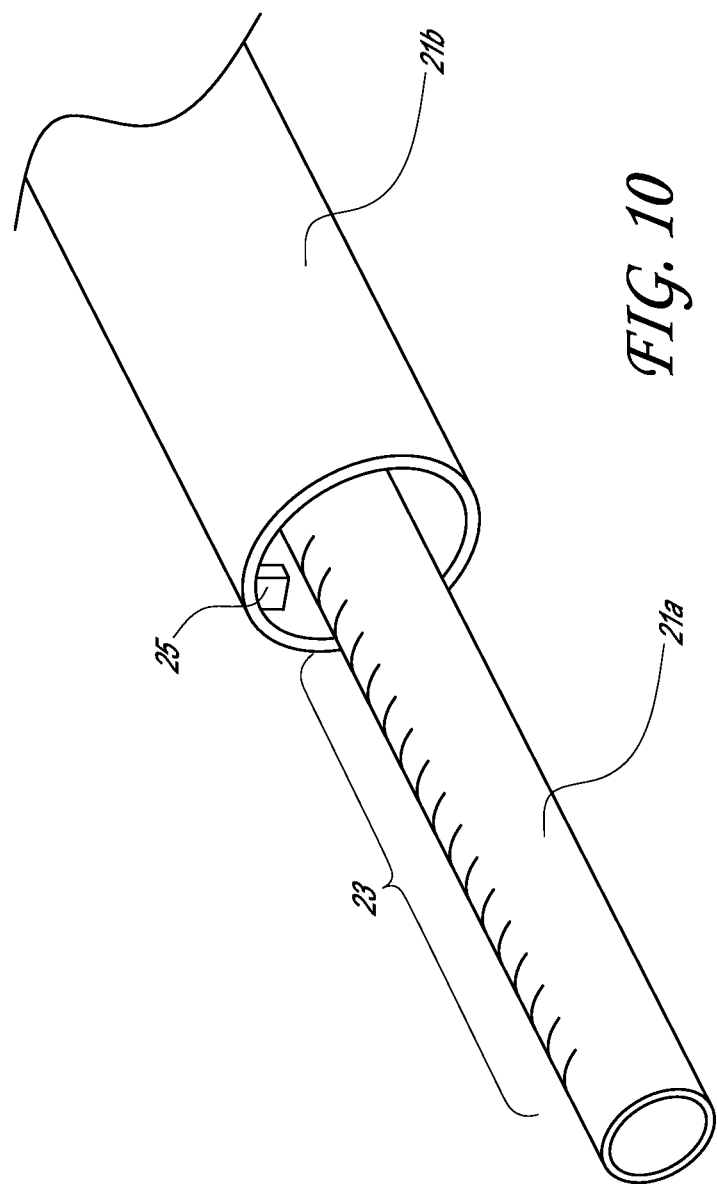

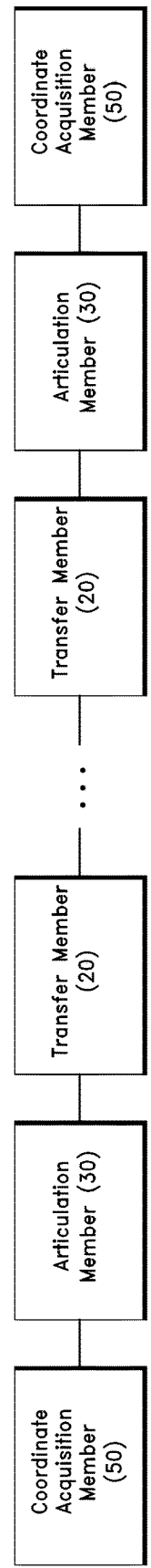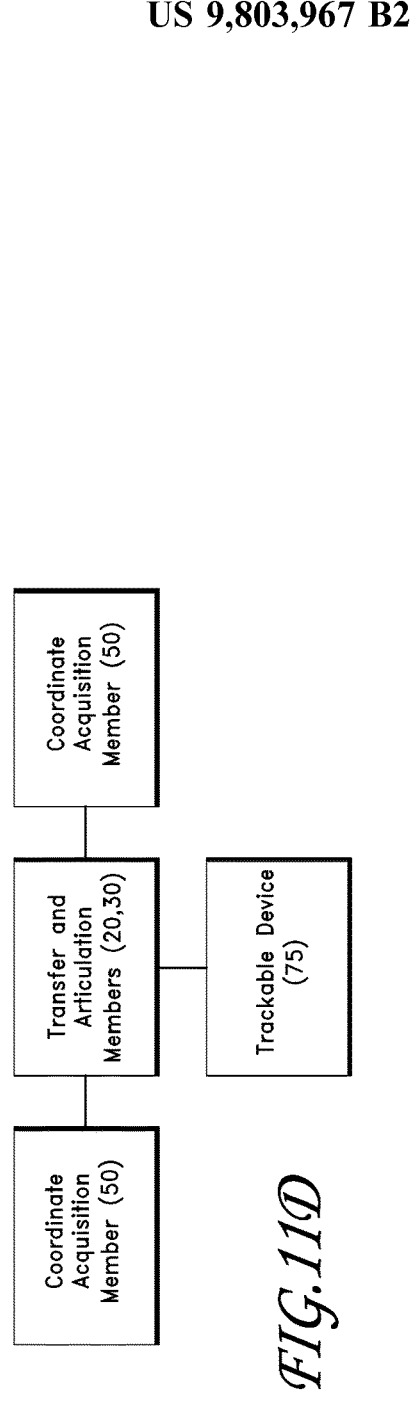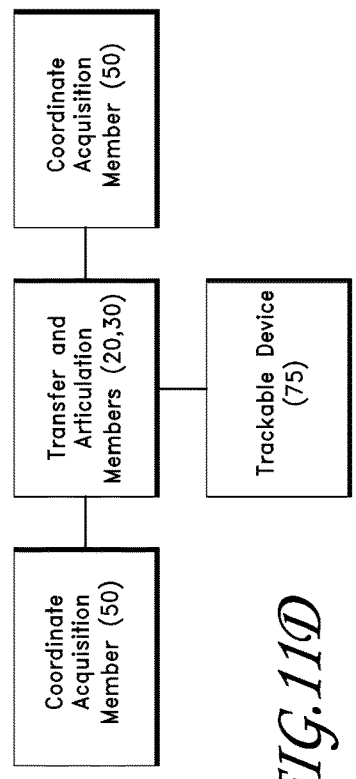

ULTRA-PORTABLE ARTICULATED ARM COORDINATE MEASUREMENT MACHINE

CROSS-REFERENCE TO RELATED APPLICATIONS

This application is a continuation of U.S. application Ser. No. 14/133,365, filed 18 Dec. 2013, now issued as U.S. Pat. No. 9,163,921. The entirety of the related applications is hereby incorporated by reference.

BACKGROUND

Field

The present invention relates to coordinate measurement, and more particularly to mobile coordinate measurement machines.

Description of the Related Art

Rectilinear measuring systems, also referred to as coordinate measuring machines and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148; 7,174,651; and 8,112,896, issued on 3 Nov. 1998, 13 Feb. 2007, and 14 Feb. 2012, respectively, which are incorporated herein by reference in their entireties.

Generally, these devices are mounted on a stable and rigid surface such as a table. In some instances, they may be rigidly attached to said surface by fasteners, suction devices, or the like. Such mounting techniques reduce the portability of the coordinate measurement machine. The disclosure herein provides improvements of at least some of these qualities.

SUMMARY

In some embodiments, an articulated arm coordinate measurement machine can include a plurality of transfer members and a plurality of articulation members connecting the plurality of transfer members to each other to measure an angle between the transfer members. The machine can additionally include at least one coordinate acquisition member positioned at an end of the articulated arm. Further, the machine can include a harness connected to at least one of the group consisting of the transfer members and the articulation members to support at least a portion of the weight of the transfer members and the articulation members. The harness can also be configured to mount to a human.

In further embodiments, an articulated arm coordinate measurement machine can include a plurality of transfer members and a plurality of articulation members connecting the plurality of transfer members to each other to measure an angle between the transfer members. The machine can additionally include at least one coordinate acquisition member, positioned at an end of the articulated arm. Further, the machine can include a trackable device mounted on the articulated arm. The trackable device can be configured to facilitate measurement of the location of the articulated arm coordinate measurement machine in space.

In further embodiments, a method can be provided for measuring one or more points. An articulated arm coordinate measurement machine can be mounted to a single person. One or more objects can then be measured with the articulated arm coordinate measurement machine while the articulated arm coordinate measurement machine is mounted to the single person.

In further embodiments, a method can be provided for measuring one or more points. An articulated arm coordinate measurement machine with a plurality of transfer members and articulation members can be carried by a user. One or more objects can then be measured with the articulated arm coordinate measurement machine while carried by the user. The location of the articulated arm coordinate measurement machine can then be tracked while measuring said one or more objects.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2B is a perspective view of a joint assembly from FIG. 2A with a cover removed.

FIG. 2C is a cross-sectional view of the joint assembly of FIG. 2B.

FIG. 2D is a cross-sectional view of the transfer member of FIG. 2A.

FIG. 4 is a perspective view of a further embodiment ultra-portable articulated arm coordinate measurement machine in folded and un-folded configurations.

FIG. 10 is a perspective view of a telescoping transfer member.

FIGS. 11A-11D and 12 are schematic drawings of various embodiment ultra-portable articulated arm coordinate measurement machines.

DETAILED DESCRIPTION OF THE PREFERRED EMBODIMENTS

Figure 1:
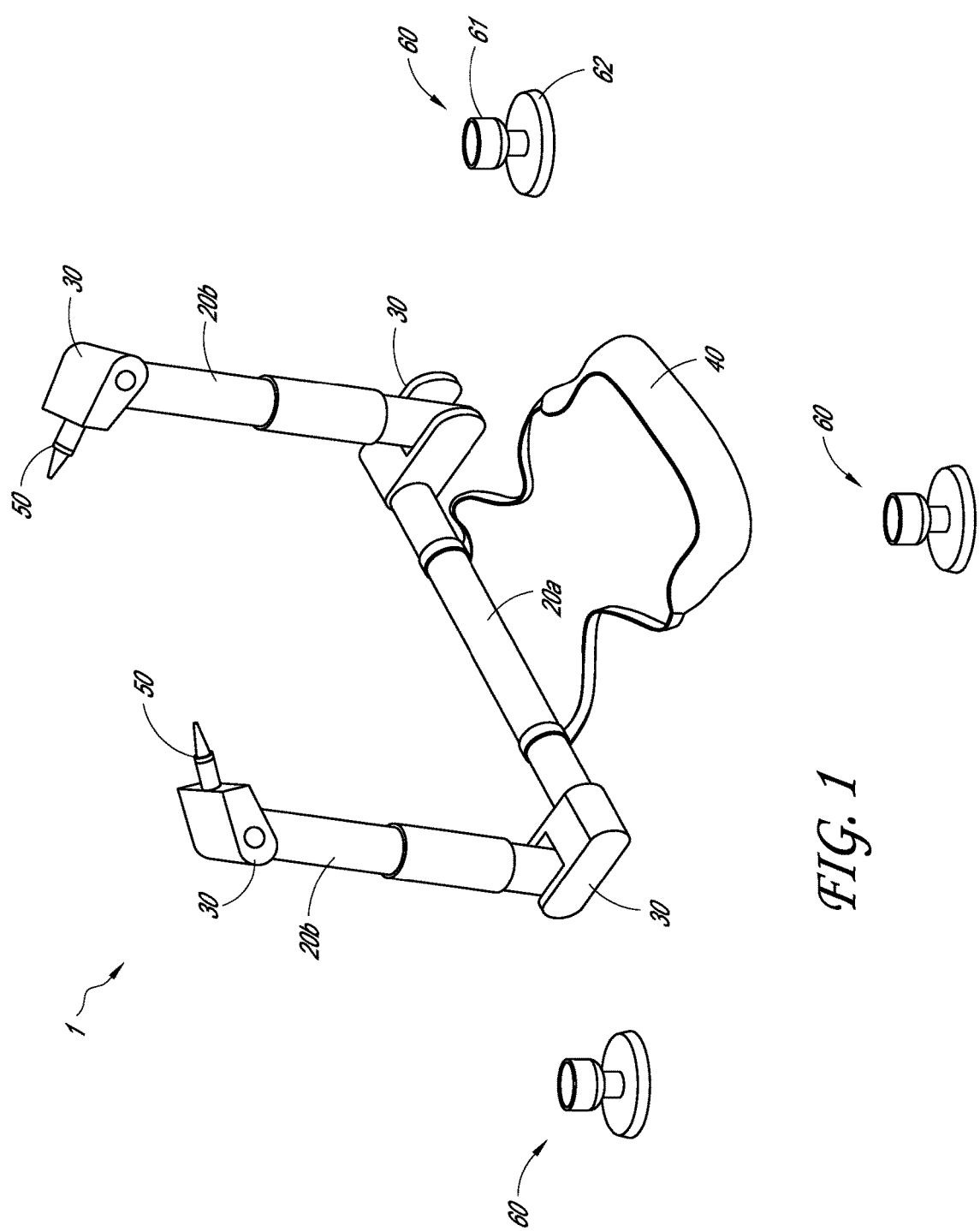
FIG. 1 is a perspective view of an embodiment ultra-portable articulated arm coordinate measurement machine system.

FIG. 1 illustrates one embodiment of a ultra-portable coordinate measuring machine ("UPCMM") 1. In the illustrated embodiment, the UPCMM 1 includes a plurality of rigid transfer members 20, two coordinate acquisition members 50 on opposite ends of the UPCMM, and a plurality of articulation members 30 that form "joint assemblies" connecting the rigid transfer members 20 and coordinate acquisition members 50 to one another. In particular, the UPCMM 1 includes a middle transfer member 20a and two side transfer members 20b attached at opposite ends of the middle transfer member. The articulation members 30 along with the transfer members 20 are configured to impart one or more rotational and/or angular degrees of freedom. Through the various members 20, 30, the UPCMM 1 can be aligned in various spatial orientations thereby allowing fine positioning and orientating of the coordinate acquisition members 50 in three dimensional space.

The position of the rigid transfer members 20 and the coordinate acquisition members 50 may be adjusted using manual, robotic, semi-robotic and/or any other adjustment method. However, as discussed herein, in some embodiments it may be particularly desirable for the rigid transfer members 20 and the coordinate acquisition members 50 to be adjusted manually. In one embodiment depicted in FIG. 1, the UPCMM 1, through the various articulation members 30, is provided with eight rotary axes of movement. However, there is no strict limitation to the number of axes of movement that may be used, and fewer or additional axes of movement may be incorporated into the UPCMM design. For example, UPCMM 1a, depicted in FIG. 3 includes two additional transfer members, and uses a backpack-style harness 40a that can act as a middle transfer member 20a. Further, the UPCMM 1a can include four additional axes of movement. In some embodiments, the UPCMM 1a can be considered to have transfer members 20 and articulation members 30 that correspond to human wrist, elbow, and shoulder joints. Unless otherwise stated, all references to the UPCMM 1 herein can optionally and alternatively apply to the UPCMM 1a, depicted in FIG. 3, the UPCMM 1b, depicted in FIG. 4, or other UPCMMs.

Figure 2A:
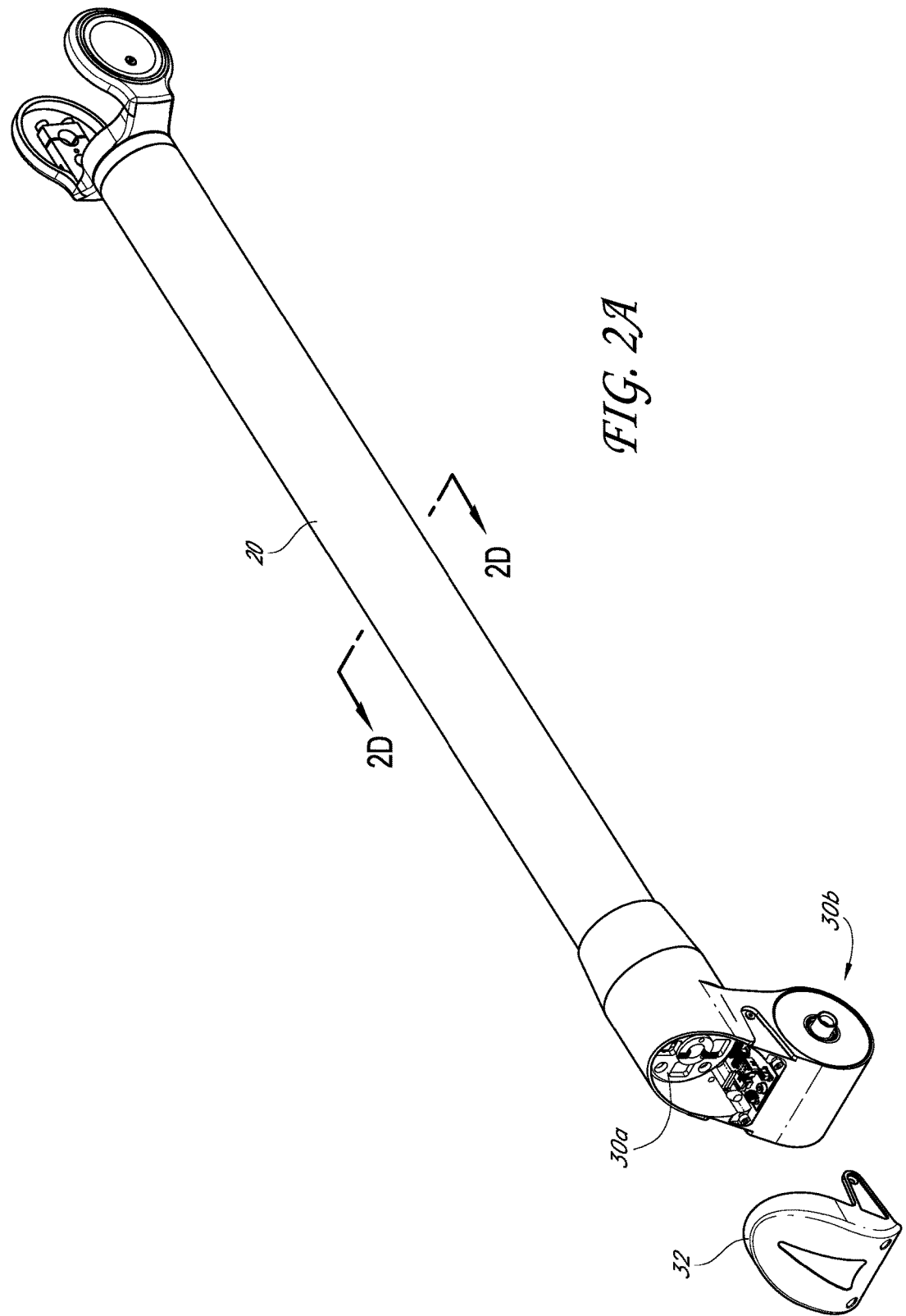
FIG. 2A is a partially exploded view of a transfer member and multiple articulation members of the ultra-portable articulated arm coordinate measurement machine of FIG. 1.

In the embodiment UPCMM 1 illustrated in FIG. 1, the articulation members 30 can be divided into two functional groupings based on their associated motion members' operation, namely: 1) those articulation members 30a which are associated with the swiveling motion associated with a specific and distinct transfer member (hereinafter, "swiveling joints"), and 2) those articulation members 30b which allow a change in the relative angle formed between two adjacent members or between the coordinate acquisition member 30 and its adjacent member (hereinafter, "hinge joints" or "hinges"). Examples of such articulation members 30 in relation to a transfer member 20 are shown in FIGS. 2A-2D. As best shown in FIG. 2A, the transfer member 20 connects to a swiveling joint 30a, which shares a housing with a hinge joint 30b. The cover 32 is shown removed to show the interior of the housing.

More specifically, as shown the UPCMM 1 is substantially symmetrical about the middle transfer member 20a. Each end of the middle transfer member 20a connects by both a swivel joint 30a and a hinge joint 30b to an end of a side transfer member 20b. The opposite end of the side transfer members 20b connect by a swiveling joint 30a and a hinge joint 30b to a coordinate acquisition member 50. While the illustrated embodiment in FIG. 1 includes four swiveling joints 30a and four hinge joints 30b positioned as to create eight axes of movement, it is contemplated that in other embodiments, the number of and location of hinge joints and swiveling joints can be varied to achieve different movement characteristics in a UPCMM. For example, a substantially similar device with six axes of movement could simply lack the swivel joints 30a between the coordinate acquisition members 50 and the side transfer members 20b. As another example, the UPCMM 1a, depicted in FIG. 3, can include 12 axes of rotational movement. In still other embodiments, the swiveling joints 30a and hinge joints 30b can be combined and/or used in different combinations. For example, although the pictures embodiments are substantially symmetric, in other embodiments different numbers of transfer members 20 and/or articulation members 30 can be provided on either side of the device. For example, in some embodiments there may be six axes of movement on one side, and seven axes of movement on the other side (e.g., with an additional axis of movement at a coordinate acquisition member such as a laser scanner).

As is known in the art (see e.g., U.S. Pat. Nos. 8,112,896 and 5,829,148, issued on 14 Feb. 2012 and 3 Nov. 1998, respectively, which are hereby incorporated by reference herein) the transfer members 20 can include a pair of dual concentric tubular structures 20a, 20c (as shown in FIG. 2D) having an inner tubular shaft rotatably mounted coaxially within an outer tubular sheath through a first bearing mounted proximately to a first end of the member adjacent and a second bearing located at an opposite end of the member and which can be positioned within, e.g., a dual axis housing. The transfer members 20 operate to transfer motion from one end of the transfer member to the other end of the transfer member. The transfer members 20 are, in turn, connected together with articulation members 30 to form joint assemblies, which can include one or more articulation members.

The hinge joint 30b, in turn, can be formed, in part, by the combination of a yoke extending from one end of a transfer member, and a rotational shaft extending through the articulation members 30b. Both the yoke and the transfer member can then rotate about the rotational shaft to form a hinge or hinge joint 30b.

Each hinge or swiveling joint 30 can have its own dedicated motion transducer in the form of an encoder. Advantageously, both the hinge and swiveling joint encoders can be positioned at least partially, and more preferably, entirely within the dual axis housing within the respective articulation members 30. The encoder is able to sense the rotation of the hinge or swiveling joint to generate one or more sensor signals reflecting the rotation. In one embodiment, the encoder comprises an optical encoder that provides information about the angular position within the hinge or swiveling joint. In other embodiments, other suitable types of sensors may be utilized.

Further, in some embodiments one or more of the transfer members 20 can be telescoping, as depicted in FIG. 10. Thus, for example, the transfer members 20 can include an inner tube 21a mounted within an outer tube 21b such that the tubes can slide longitudinally relative to each other. Sliding between the inner and outer tubes can allow the transfer member's length to be adjustable. Further, a sensor can be included to measure the telescoping position of the transfer member 20 such that the length of the transfer member can be measured. For example, in some embodiments the sensor can be a linear encoder. In the context of the UPCMM 1, the side transfer members 20b can be telescoping. However, in other embodiments the middle transfer member 20a can be telescoping. In further embodiments, all three transfer members 20 can be telescoping. Advantageously, the telescoping transfer members can allow for a greater range of motion of the UPCMM 1. Further, the telescoping transfer members can effectively adjust the size of the UPCMM 1, such that it can be appropriately-sized for smaller and larger users with different arm lengths.

In various embodiments, the coordinate acquisition members 50 can include a contact sensitive member (depicted as a hard probe in FIG. 1) configured to engage the surfaces of a selected object and generate coordinate data on the basis of probe contact, such as a contact probe, an eddy current sensor, an acoustic or Doppler sensor, or a magnet. In other embodiments, the coordinate acquisition members 50 can additionally or alternatively include a non-contact scanning and detection component that does not necessarily require direct contact with the selected object to acquire geometry data. For example, the non-contact scanning device can include a non-contact coordinate detection device (such as a laser coordinate detection device/laser scanner) that may be used to obtain geometry data without direct object contact. The non-contact scanning device can include a camera or other optical device, which functions in conjunction with a laser. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

Further description of certain embodiments of a coordinate acquisition member that can be used with the embodiments described herein can be found in U.S. Pat. Nos. 8,112,896 and 7,908,757, issued 14 Feb. 2012 and 22 Mar. 2011, respectively, which are incorporated by reference herein in their entirety. As depicted in said references, the coordinate acquisition member can include a modular laser scanner that can attach to the main body of the coordinate acquisition member (which can also include a touch probe). The modular features can allow various other coordinate detection devices to be used with the coordinate acquisition member. Additionally, other coordinate acquisition members can be used, as is generally known by those of skill in the art.

Various arrangements of the coordinate acquisition members 50, transfer members 20, and articulation members 30 are shown schematically in FIGS. 11A-11D, further including trackable devices 75, further discussed below. As shown in FIG. 11A, two coordinate acquisition members 50 can be connected at opposite ends, with a plurality of transfer members 20 and articulation members 30 between them. In some embodiments, the transfer members 20 and articulation members 30 can alternate, as shown in FIG. 11B. However, in other embodiments multiple articulation members 30 can be adjacent, such as with a pair of hinge and swivel joints. As shown in FIG. 11C, in some embodiments a trackable device 75 can replace one of the coordinate acquisition members 50, such that one end has a coordinate acquisition member and the other end has the trackable device. Further, as shown in FIG. 11D, in some embodiments the trackable device 75 can be disposed on the transfer members 20 and/or the articulation members 30 (e.g., on a harness).

Additionally, as shown, the UPCMM 1 can include a harness 40 configured to mount to a human. The harness 40 can additionally attach to one or more of the transfer members 20 and/or the articulation members 30. More generally, the harness 40 can attach to the rest of the UPCMM 1 along any of the arm portions. In some embodiments the harness 40 will connect on opposite sides of a middle transfer member 20a. Further, in some embodiments the harness 40 will attach at a center of the UPCMM 1, or on substantially symmetrical locations on opposite sides of a center of the UPCMM. For example, in some embodiments the harness 40 may attach at opposite side members 20b or at opposite sides of the middle transfer member 20a.

As noted, the harness 40 can be configured to mount to a human. As shown in FIG. 1, the harness 40 can include a shoulder strap that can mount around a person's shoulders or neck. The harness 40 can optionally include padding, a widened portion, adjustable straps, additional straps, locking mechanisms, and the like. In some embodiments, the harness 40 can be a backpack. In further embodiments, the harness 40 can be a single strap, such as in the form of an apron or a messenger bag. In other embodiments, the harness 40 can be configured to mount to other portions of a human such as about the hips as a belt. In further embodiments, the harness 40 can be configured to mount to both the shoulders and hips of a human.

Figure 3:
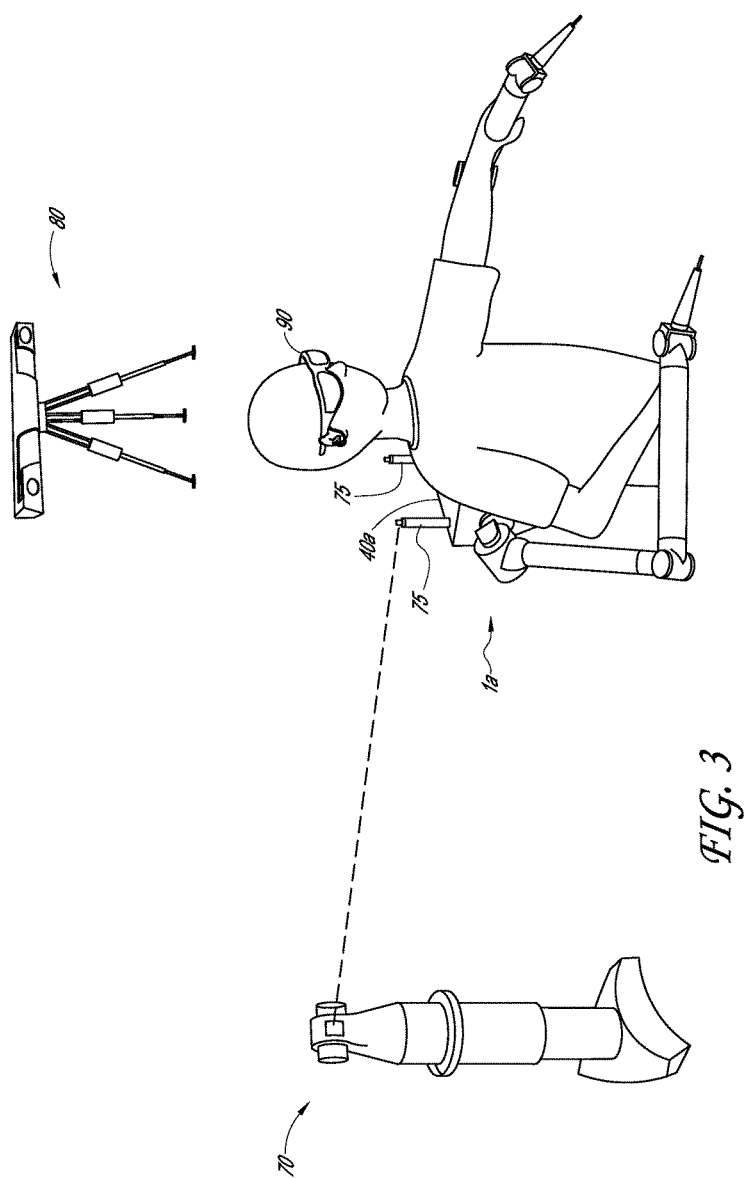
FIG. 3 is a perspective view of a further embodiment ultra-portable articulated arm coordinate measurement machine system.

Embodiments of a backpack-style UPCMM 1a are depicted in FIG. 3. As shown, the UPCMM 1a can include two side transfer members 20b on either side of a backpack harness 40a. The main portion of the backpack harness 40a can thus act as the middle transfer member 20a of the previously described UPCMM 1. The backpack harness 40a can also carry additional electronic features, further discussed below. Yet another embodiment of a backpack-style UPCMM 1b is depicted in FIG. 4. As shown, the UPCMM 1b can include a harness 40b including hooks that mount about a human's shoulders. It will be understood that, unless indicated to the contrary, features described below relating to the harness 40 in FIG. 1 can also optionally or alternatively be applied to the other harnesses disclosed herein.

The harness 40 can attach to at least one of the transfer members 20 and the articulation members 30 to support the weight of the transfer members and the articulation members. For example, in some embodiments the harness 40 can support at least 50%, 75%, or substantially all of the weight of the transfer members 20 and the articulation members 30.

Further, in some embodiments UPCMMs (such as UPCMM 1b, depicted in FIG. 4) can be configured to easily fold together. The UPCMM 1b can then be stored in a carrying case. Notably, because the harness of the UPCMM 1b can be at a substantially central location of the arm (as discussed with respect to each of the embodiments discussed above), the UPCMM will usually not be cantilevered as far as standard PCMMs which extend from a base at the end. Thus, the UPCMM 1b can include transfer members and articulation members with less structural strength, as they do not need to support as much torque. Accordingly, the UPCMM 1b can be made lighter, making it easier to be carried by a user both during use and when in a carrying case. It will be understood that these features can additionally or alternatively be applied to other UPCMMs 1, 1a depicted herein or otherwise.

Figure 12:
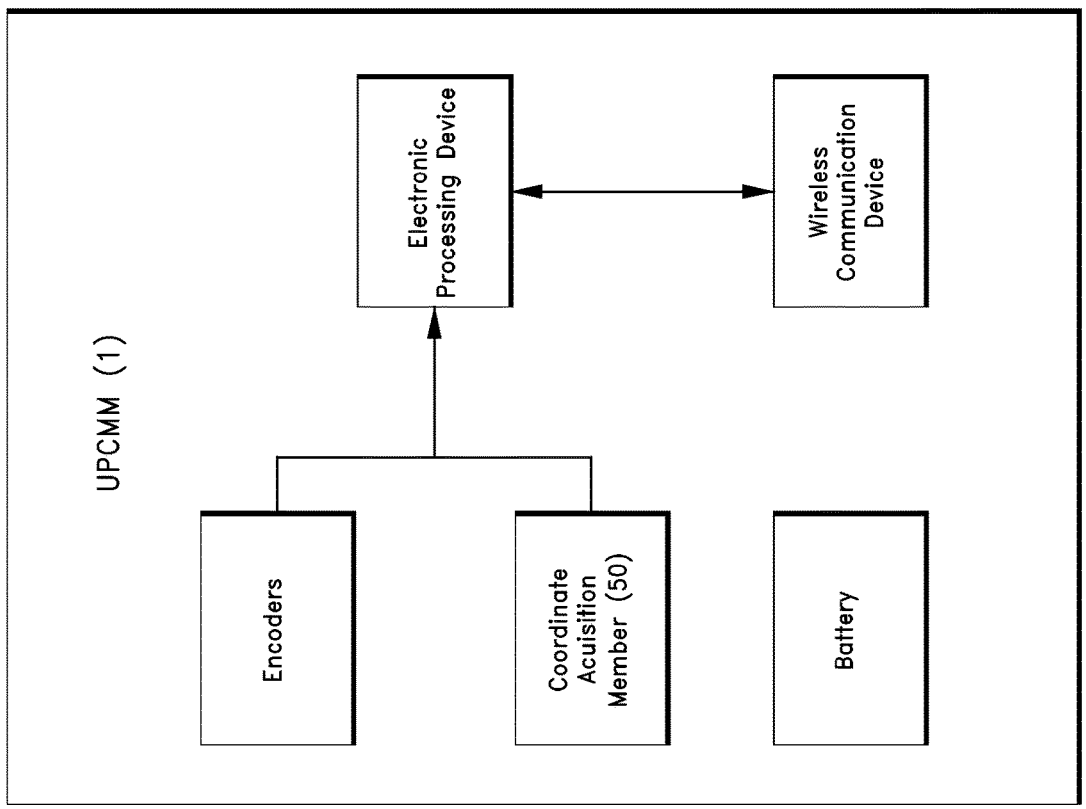

Electronic processing devices such as PC boards containing microprocessors that can serve to manage encoder synchronization, scanner processing, combination of arm and scanner data, and communication with an additional computer, tablet, or display device, can be located inside of the tubular members 21 of the transfer members 20 (as shown schematically in FIG. 12). Alternatively, such electronics could be located external to the tubular members 21 in a housing, or inside or outside of one of the joints 30. In some embodiments it could be preferable to locate the electronics processing devices in the harness 40 which could be a backpack or belt. In some embodiments, locating the electronics in the harness can remove weight and heat from the encoders and other sensors. It is also possible to locate one or more batteries and wireless communication devices in close proximity to the electronics processing devices inside or outside the tubes, joints, or harness, or in an additional embodiment, the battery and wireless devices may be located remotely from the electronics processing devices.

Generally, embodiment UPCMMs 1 can be operated by a human user, who can also optionally carry the UPCMM. The user can move the UPCMM 1 in space to eventually contact or be in close proximity to an object to be measured. During this time, the UPCMM 1 can optionally continuously measure its own position using angular and/or linear encoders. In other embodiments, the UPCMM 1 can only measure its own position when taking a measurement, such as when absolute encoders are used. When a user determines that a measurement should be taken, such a command can be inputted (e.g., by pressing a button, contacting the object, etc.). A trigger signal can then be generated, indicating that a measurement from the encoders at a given time should be recorded. These measurements can then be sent to a processing such as the electronic processing device or external electronics to determine the position of the object or a point on the object, using the measured angular/linear positions of the transfer members 20 and the articulation members 30.

Figure 5:
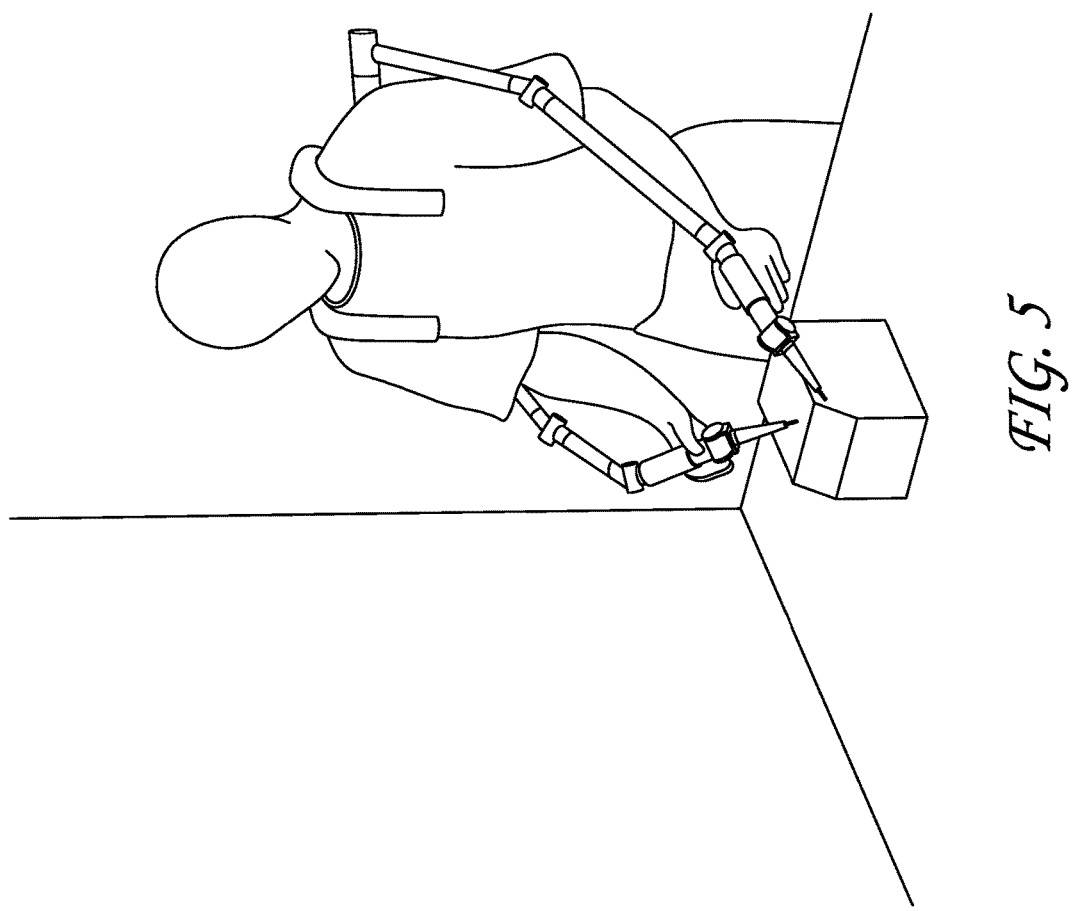
FIG. 5 is a perspective view of the ultra-portable articulated arm coordinate measurement machine used in an embodiment caliper mode.
Figure 6:
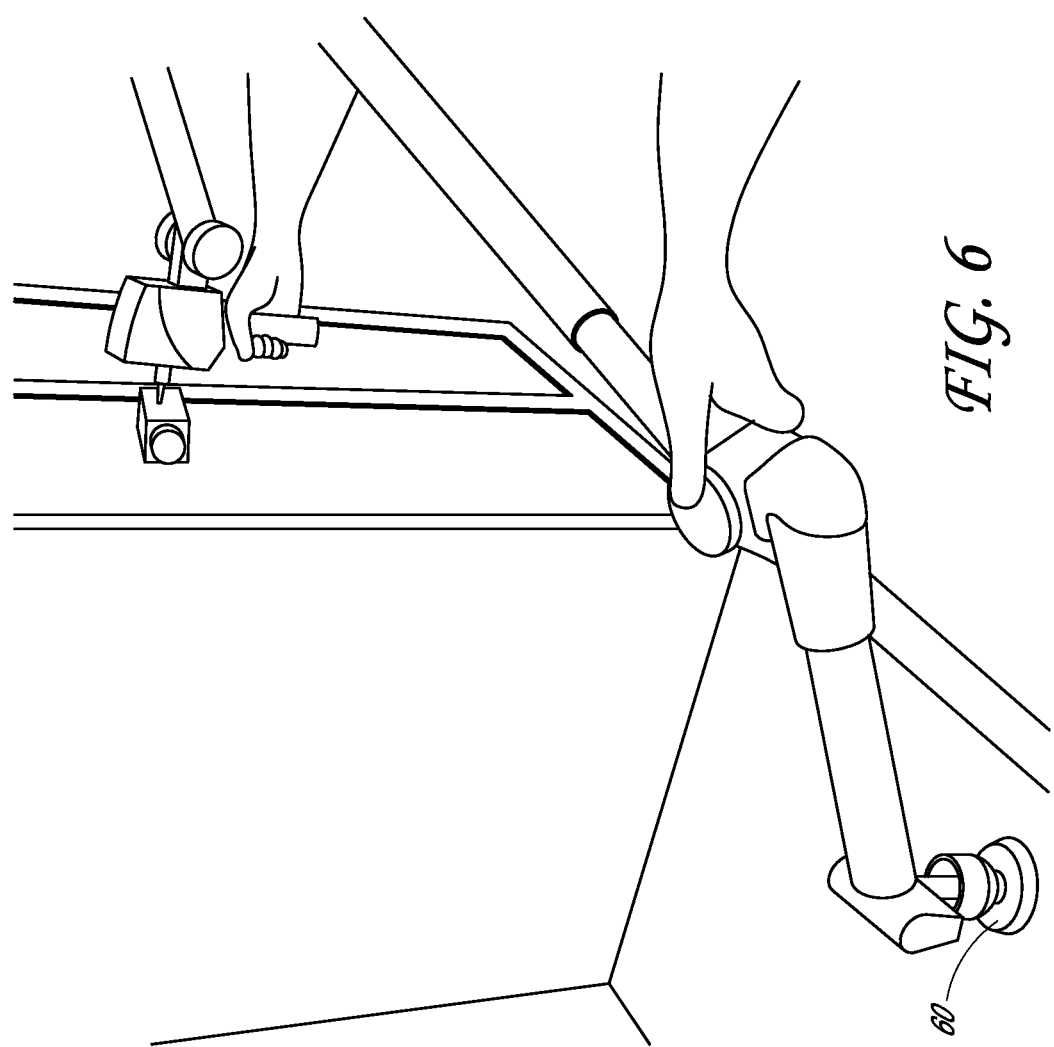
FIG. 6 is a perspective view of the ultra-portable articulated arm coordinate measurement machine used in an embodiment locked mode.

As shown in FIGS. 5 and 6, UPCMMs can be used in a variety of ways different from normal PCMMs. For example, as shown and discussed above, the UPCMM 1 can be significantly more portable, allowing a user to easily take measurements at a variety of locations separated by a distance greater than a maximum measuring length of the UPCMM. The user can simply walk to a new location to be measured, without needing to move a base of a normal PCMM, which may be fastened to the ground or another less moveable or non-moveable surface.

A variety of systems and methods are available to measure an absolute location of the points measured by the UPCMM 1. For example, normal PCMMs intrinsically measure a position of the various transfer members relative to each other, thus generating a position of the coordinate acquisition member relative to a base of the PCMM. Because the base of the PCMM does not move, the measured positions can be in the same coordinate system and thus their positions relative to each other can be known. The location of the base in space can then optionally be measured by other devices or methods (such as those described herein).

As used herein, a "location" or a "location in space" will refer to a location relative to a greater reference frame, such as a geospatial location on Earth or a location in a room. In contrast, as used herein, a "position" or a "position of the UPCMM" will refer to a position of the UPCMM, and its respective transfer members 20, coordinate acquisition members 50, and other components, relative to itself/themselves. Thus, for example, a "position" measured by the UPCMM may refer to the angles of the articulation members 30 and the corresponding measured position of a point measured by a coordinate acquisition member 50 relative to another coordinate acquisition member on the UPCMM. However, if the UPCMM is later moved to a new "location" (e.g., to a location out of reach from its previous location), then a different point could be measured by the UPCMM while in the same "position." Thus, a point could be defined by combining both the "position" and the "location" of the UPCMM. In other words, two unique points can have the same "position" when measured from different "locations."

When desirable, UPCMMs can use other methods to relate the positions of various measured points to each other. Notably, the embodiment UPCMMs discussed above do not include a permanently located base. Thus, measuring the positions of the transfer members relative to each other (and other components of the UPCMM) can yield a position of the coordinate acquisition member at one time, which may not be consistent (or in the same reference frame) as coordinates measured at other times.

Figure 7:
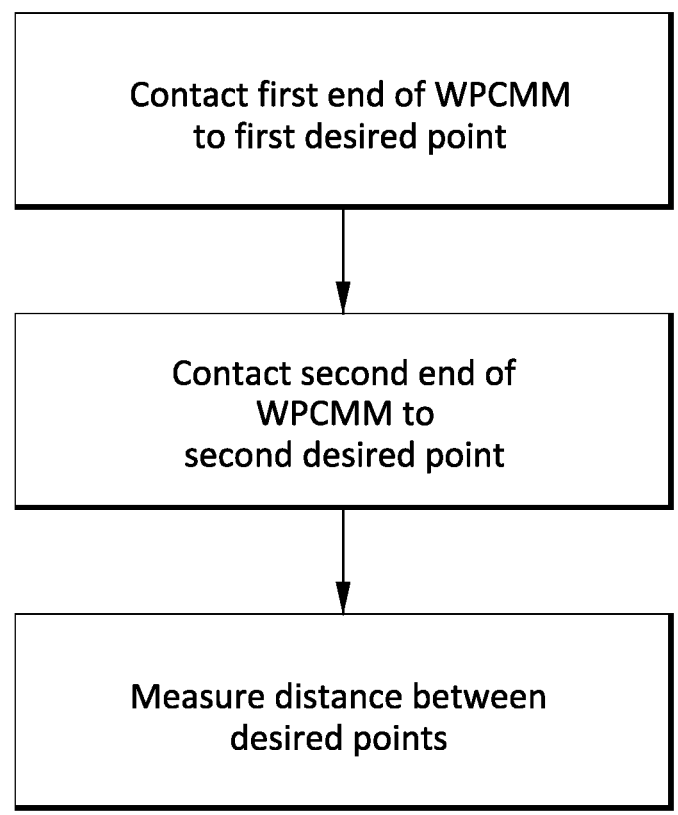
FIG. 7 is a flow chart showing a method to make measurements in a caliper mode.

In one method, consistency between coordinates measured at different times can be ignored. For example, in some embodiments the UPCMM 1 can be used like 3 dimensional calipers, as shown in FIGS. 5 and 7. Thus, for example, the UPCMM 1 can be used to measure the distance between two desired points by placing the two ends of the UPCMM 1 in contact with the two points of interest. A measurement can then be taken, indicating a distance between the two desired points. Even further, if the UPCMM 1 is configured to measure its orientation in space (i.e., its angular position, optionally with respect to gravity), then a distance and angle between the two points (i.e., a vector) can be measured. In some embodiments the UPCMM 1 can include a tilt sensor (or another device measuring orientation relative to the Earth or another reference frame, such as an accelerometer) located within the UPCMM to measure an angular position of the UPCMM in space. In other embodiments, the UPCMM 1 can cooperate with an external system (such as an imaging system, further described below), that can measure an angular position of the UPCMM.

In other contexts, it will be desirable to maintain consistency between coordinates measured from different locations. One method for relating the positions of various measured points of a UPCMM 1 is to provide an effective base for the UPCMM. For example, as shown in FIG. 1, a UPCMM 1 system can include one or more nesting devices 60. As shown in FIG. 1, the nesting devices can generally include a receiving portion 61 and a base portion 62. The receiving portion 61 can be generally cup-shaped, to receive a coordinate acquisition member 50 of the UPCMM 1, such as a contact-sensitive member. Thus, in some embodiments the nesting device 60 can be sized to provide a close and secure fit with the coordinate acquisition member 50. In further embodiments, the coordinate acquisition member 50 can releasably attach to the receiving portion 61 of the nesting device 60, as shown in FIG. 6. For example, in some embodiments the receiving portion 61 of the nesting device 60 and the coordinate acquisition member 50 can use a magnetic force to hold them together. In other embodiments, the coordinate acquisition member 50 can snap into a connection with the receiving portion 61 of the nesting device 60, such as with a releasable locking latch between the coordinate acquisition member and the nesting device 60. Further, in some embodiments fasteners, such as screws, can securely hold the coordinate acquisition member 50 in the receiving portion 61 of the nesting device 60.

The base portion 62 of the nesting device 60 can be configured to rigidly attach the nesting device 60 to a substantially stationary surface. For example, the base portion 62 of the nesting device 60 can include threaded holes or through-holes, or otherwise be configured to receive fasteners that attach the nesting device to a wall, table, floor, or other substantially stationary surface. In further embodiments, the base portion 62 can include a magnetic material such that it can magnetically attach to such surfaces. In even further embodiments, the base portion 62 may include suction devices, latching devices, or any other means for providing a secure connection to the surface. Even further, in some embodiments nesting devices 60 may be formed integrally with larger structures (e.g., a wall, table, floor, or even the object to be measured), such that the entire structure can act as a base portion 62 of the nesting device 60. It will be understood that the attachment between the base portion 62 and the surface, and between the receiving portion 61 and the UPCMM 1 should be substantially secure so as not to introduce additional error to measurements by the UPCMM 1.

Figure 8:
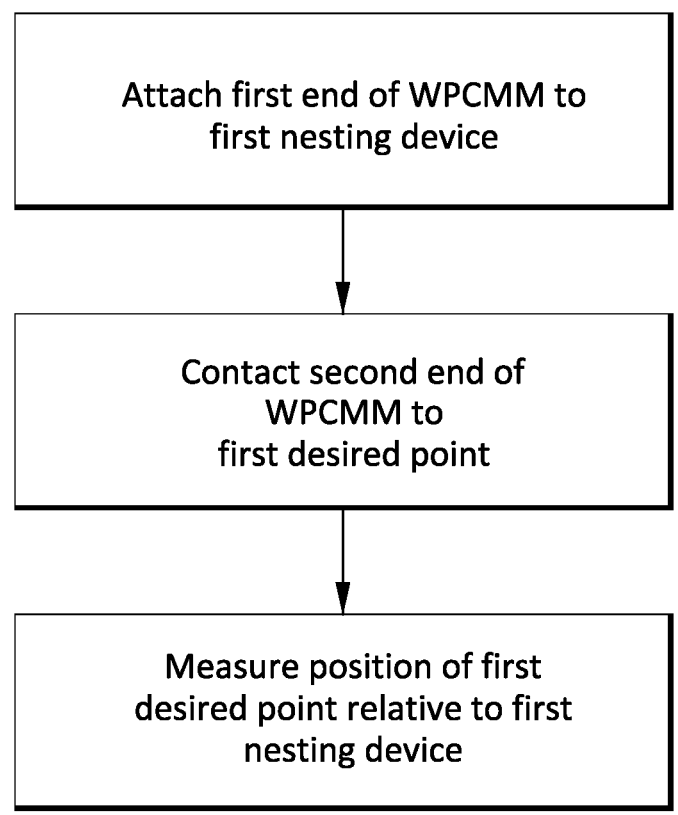
FIG. 8 is a flow chart showing a method to make measurements while connected to a nesting device.

As noted above, the nesting device 60 can act effectively as a base for the UPCMM 1. Thus, when one end of the UPCMM 1 is connected to the nesting device 60, the other end of the UPCMM 1 (and an associated coordinate acquisition member 50) can measure positions relative to the nesting device 60 (i.e., in a reference frame relative to the nesting device). Thus, for example, the UPCMM 1 will be able to measure a distance between a nesting device 60, to which a first end of the UPCMM is attached, and a location measured by the second end of the UPCMM (e.g., by contact with the second end). An example of such a method is depicted in FIGS. 5 and 8. Further, in some embodiments the first end of the UPCMM 1 can be rotationally fixed to the nesting device 60 such that its rotational orientation is held constant. Thus, both the distance and angle between the nesting device 60 and the measured location can be determined. In other embodiments, an angular orientation of the UPCMM 1 relative to the nesting device 60 can be determined by other means such as a tilt sensor or an imaging system, as further described above and below.

Figure 9:
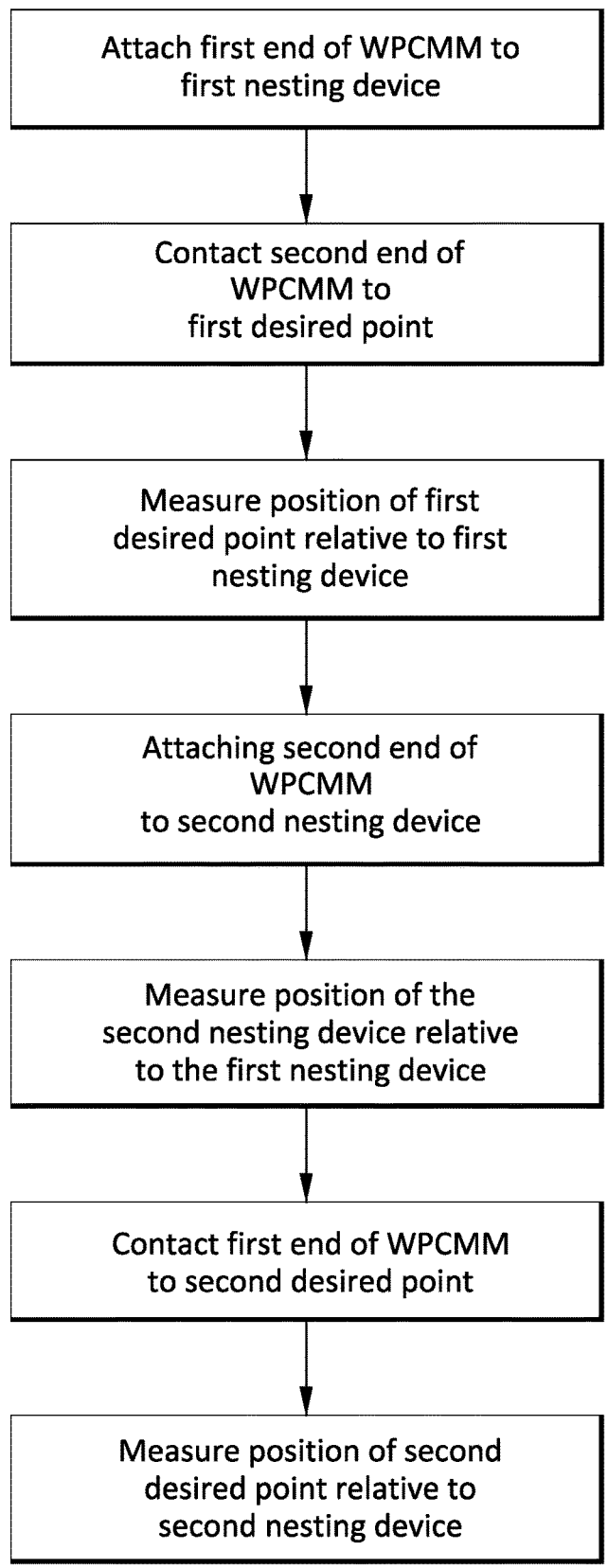
FIG. 9 is a flow chart showing a method to make multiple measurements beyond the range of a standard coordinate measuring machine.

Notably, multiple nesting devices 60 can also be used. In some embodiments, the nesting devices 60 can be positioned sufficiently close such that from any one nesting device 60, the UPCMM 1 can reach to at least one other nesting device 60. As long as two or more of these nesting devices are positioned in series, within said distance, one can measure consistent coordinates while attached to any of the nesting devices 60, as indicated by example in the method depicted in FIG. 9.

Thus, for example, one could attach a first end of the UPCMM 1 to a first nesting device and measure a first unique point's position with the second end of the UPCMM, such that the position of the point is known relative to the first nesting device. Then, one could attach the second end of the UPCMM 1 to a second nesting device, and measure the two nesting devices' positions relative to each other. Then, one could detach the first end of the UPCMM 1 from the first nesting device, and measure a second unique point's position, such that the position of the second point is known relative to the second nesting device. Because the position of the two nesting devices relative to each other is also known, the position of the two measured points is also known relative to each other, and relative to both of the nesting devices. Notably, the second measured point may be unreachable by the UPCMM 1 from the first nesting device. Thus, under this method, the reach of the UPCMM 1 can be effectively extended by moving between nesting devices 60. It will be understood that in some embodiments more than two nesting devices 60 can be used to extend the range of the UPCMM 1 even further.

In embodiments without nesting devices 60, or where nesting devices 60 are not available within range of all points that one would like to measure, other methods and systems can be used to relate coordinates measured by the UPCMM 1. For example, in some embodiments the location of the UPCMM 1 can be measure relative to another reference frame. For example, in some embodiments the UPCMM 1 can be associated with a laser tracker. Examples of such laser trackers are depicted in FIG. 3 and further disclosed in U.S. Patent Application No. 2012/0105821, published 3 May 2012, which is incorporated by reference herein. As shown, the laser tracker 70 can be positioned to track a position on the UPCMM 1 relative to the stationary laser tracker. In some embodiments, the UPCMM 1 can optionally include a trackable device 75 on the harness 40, or in more specific embodiments on a backpack portion of the UPCMM. In some embodiments the trackable devices 75 can be located along portions of the transfer members 20, the tubes 21, at the joints 30, or at one or both of the coordinate acquisition members 50. In some embodiments the UPCMM 1 can be tracked from one end of the UPCMM and measurements can be taken with the other end of the UPCMM using the coordinate acquisition members 50 at the other end. For example, one end can include a trackable device 75 and the other end can include one or more coordinate acquisition members 50. In some embodiments, the trackable device 75 can be a retroreflector or another reflective device easily detected by the laser tracker 70. Further, in some embodiments multiple trackable devices 75 can be included on the UPCMM 1, improving the accuracy of the measured location and orientation of the UPCMM. One preferred embodiment can include one or more retroflectors and a series of LED's or markers that can be seen by the tracking device. Even further, in some embodiments the disposition of the laser tracker 70 and the trackable devices 75 can be reversed, such that the tracker 70 is mounted on the UPCMM 1 and the trackable devices 75 are at a fixed location. It will be understood that other tracking systems can be used, that are not necessarily limited to lasers.

For example, in further embodiments an optical tracker 80 can be used to track a position and orientation of the UPCMM 1. Examples of such optical trackers are depicted in FIG. 3 and further disclosed in U.S. Pat. No. 7,945,311, issued 17 May 2011, which is incorporated by reference herein. The optical tracker 80 can capture one or more images of the UPCMM 1 and use those images to measure a location of the UPCMM relative to the optical tracker 80. As shown, the optical tracker 80 can optionally include two side-by-side cameras to create a stereoscopic measurement. However, in other embodiments more cameras can be used. Further, in some embodiments the cameras can be positioned independently. For example, in some embodiments the cameras can be mounted at different locations in a room. Further, in some embodiments, three or more than three cameras can be used. Similar to embodiments with the laser tracker 70, discussed above, the UPCMM 1 can optionally include trackable devices 75 that can facilitate recognition by the optical tracker 80. Additionally, in some embodiments the optical tracker 80 can be mounted on the UPCMM 1, as described with the laser tracker 70.

Again, it will be understood that other tracking systems can be used. For example, some trackers can operate using signals other than visible light, such as other portions of the electromagnetic spectrum. Further, in some embodiments the position and orientation of the UPCMM 1 can be determined with multiple sensors detecting its position (or the position of multiple trackable devices) by triangulation. In further embodiments the tracking can de done by a series of cameras that track markers on the UPCMM 1.

Additionally or alternatively, in some embodiments the UPCMM 1 can be used with a heads-up-display ("HUD") 90. Because the UPCMM 1 can be particularly portable, it is less likely that a user will be near a computer monitor or other visual output device during use. Thus, a portable display may be advantageous. As shown in FIG. 3, the user can wear a portable display 90 that provides a visual display to the user. As shown, the portable display 90 can be a HUD in the form of glasses. The glasses can include a projector or other display mechanism that the user can see during operation. In some embodiments, a processor on the main body of the UPCMM 1 (such as a processor located on the harness 40, inside or outside the transfer members 20 or tubes 21, or inside or outside the joints 30) can communicate by wire or wirelessly with the portable display 90 to control what is displayed. Thus, for example, the HUD can provide information such as what points have been measured, remaining battery life, a measuring mode of the UPCMM 1, and the like.

Additionally or alternatively, in some embodiments the UPCMM 1 can be at least partially controlled by motion of the arm itself. Because the UPCMM 1 may be more portable than usual PCMMs, a user of a UPCMM may be far from a computer or other command-input device in communication with the PCMM. Thus, additional command-input options may be desirable. For example, whereas some commands or instructions may be triggered by the pressing of a button, pulling a lever, turning a dial, or actuating some other traditional actuation device in some embodiments, in other embodiments the same or different instruction can be triggered by a specific motion or position of the UPCMM 1, which can be detected by the encoders and other sensors in the UPCMM. For example, in some embodiments the arm can enter into different data acquisition modes depending on its speed of movement. An operator of the UPCMM 1 may move the UPCMM slowly when a critical point will soon be measured. Thus, the UPCMM 1 can increase its measurement frequency, accuracy, or other characteristics when the arm is moving slowly. Additionally, the UPCMM 1 can be toggled between a mode where the arm is used as a computer mouse and a measurement mode with a quick movement of one of the last axes.

Further, in some embodiments the location of the UPCMM 1 in space can be used to input commands to the UPCMM 1. For example, when used with a tracking device such as the laser or optical trackers 70, 80, the UPCMM 1 may enter a low-power or sleep mode when near the trackers, or another designated area. While near the trackers or the other designated area, the operator may be at a computer or desk far from the object(s) to be measured. Thus, the UPCMM 1 can reduce its power consumption while not measuring the object. Similarly, in some embodiments the UPCMM 1 can enter a low power or sleep mode in response to a certain position, such as an arms-folded position. In some embodiments the UPCMM 1 can reenter an awake mode or normal measuring mode when it is located further away from the trackers. In other embodiments, the awake or normal measuring mode can be triggered by a position of the UPCMM 1 such as an arms-wide-open position. Further details regarding alternative methods of data entry can be found in U.S. Pat. No. 8,112,896, issued 14 Feb. 2012, which is incorporated by reference herein.

As with the previous embodiments, it should be appreciated that these features related to control of the arm can be used in other types of CMMs and need not be used in combination with the additional embodiments described above and below the preceding section.

In further embodiments, the harness 40 can provide for a wide variety of functionality. For example, as discussed above, the harness 40 can include trackable devices 75 and can serve as a middle transfer member 20*a*. Additionally, in some embodiments the harness 40 can include a processor configured to receive signals from the encoders associated with the articulation members and process them for a variety of purposes. In some embodiments, the data from the encoders can be stored on a memory within the harness 40. In further embodiments, the data can be transmitted to an external computer or processor by wire or wirelessly. Further, the harness 40 can include a power supply, heat transfer devices, global positioning devices, and the like.

Even further, in some embodiments these and other features can be modularly provided by feature packs that can connect with the harness 40 or another portion of the UPCMM 1 via a docking portion. The docking portion can form an electronic connection between the UPCMM 1 and the feature pack. In some embodiments the docking portion can provide connectivity for high-speed data transfer, power transmission, and the like. Thus, when connected to a docking portion, a feature pack can provide a modular electronic, mechanical, or thermal component to the UPCMM 1, allowing a variety of different features and functionality such as increased battery life, wireless capability, data storage, improved data processing, processing of scanner data signals, temperature control, mechanical support or ballast, or other features. The modular feature packs can contain connectors for enhanced functionality, batteries, electronic circuit boards, switches, buttons, lights, wireless or wired communication electronics, speakers, microphones, or any other type of extended functionality that might not be included on a base level product. Further, in some embodiments the feature packs can be positioned at different portions of the UPCMM 1, such as along a transfer member, an articulation member, or as an add-on to the coordinate acquisition members 50 or an associated handle.

As one example, a feature pack can include a battery, such as a primary battery or an auxiliary battery. Advantageously, in embodiments where the pack is an auxiliary battery the UPCMM 1 can include an internal, primary battery that can sustain operation of the UPCMM while the auxiliary battery is absent or being replaced. Thus, by circulating auxiliary batteries a UPCMM 1 can be sustained indefinitely with no direct power connection.

As another example, a feature pack can include a data storage device. The available data storage on the feature pack can be arbitrarily large, such that the UPCMM 1 can measure and retain a large amount of data without requiring a connection to a larger and/or less convenient data storage device such as a desktop computer. Further, in some embodiments the data storage device can transfer data to the arm, including instructions for arm operation such as new commands for the arm upon pressing of particular buttons or upon particular motions or positions of the arm, or other customizable settings.

In examples where the feature pack includes wireless capability, similar functionality can be provided as with a data storage device. With wireless capability, data can be transferred between the UPCMM 1 and an external device, such as a desktop computer, continuously without a wired connection. In some embodiments, the UPCMM 1 can continuously receive commands from the auxiliary device. Further, in some embodiments the auxiliary device can continuously display data from the arm, such as the arm's position or data points that have been acquired. In some embodiments the device can be a personal computer ("PC") and the feature pack can transmit arm coordinate data and scanner data wirelessly to the PC. Said feature pack can combine the arm data and scanner data in the feature pack before wireless transmission or transmit them as separate data streams.

In further embodiments, the feature packs can also include data processing devices. These can advantageously perform various operations that can improve the operation of the arm, data storage, or other functionalities. For example, in some embodiments commands to the arm based on arm position can be processed through the feature pack. In additional embodiments, the feature pack can compress data from the arm prior to storage or transmission.

In yet another example, the feature pack can include thermal functionality. For example, the feature pack can include a heat sink, cooling fans, or other heat transfer devices. A connection between the docking portion and the feature pack can also connect by thermally conductive members to electronics in the UPCMM 1, allowing substantial heat transfer between the UPCMM arm and the feature pack.

Further, in some embodiments the feature packs can have a size and shape substantially matching a side of the UPCMM 1 to which they connect. Thus, the feature pack can be used without substantially increasing the size of the UPCMM, reducing its possible portability, or limiting its location relative to other devices.

Again, the feature packs can be used in combination with each other and the other features described herein and/or can be used independently in other types of CMMs. Additional description of the feature packs can be found in U.S. Pat. No. 8,112,896, issued 14 Feb. 2012, which is incorporated by reference herein.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. An articulated arm coordinate measurement machine comprising:
   a plurality of device arm members;
   a plurality of device articulation members connecting the plurality of device arm members to each other to measure an angle between the device arm members; and
   at least one coordinate acquisition member, positioned at an end of the articulated arm;
   wherein the articulated arm coordinate measurement machine is configured to mount to a human such that the device arm members align with at least one arm of the human during use.

2. The articulated arm coordinate measurement machine of claim 1, wherein the articulated arm coordinate measurement machine is configured to mount to a human such that the device arm members align with both arms of the human during use.

3. The articulated arm coordinate measurement machine of claim 1, wherein the articulated arm coordinate measurement machine comprises a harness configured to mount to the human.

4. The articulated arm coordinate measurement machine of claim 3, wherein the harness is configured to support at least a portion of the weight of the device arm members and the device articulation members.

5. The articulated arm coordinate measurement machine of claim 1, wherein at least one coordinate acquisition members comprises a contact sensitive probe.

6. The articulated arm coordinate measurement machine of claim 1, wherein at least one coordinate acquisition members comprises a laser scanner.

7. The articulated arm coordinate measurement machine of claim 1, wherein at least one of the device arm members is telescoping.

8. The articulated arm coordinate measurement machine of claim 7, wherein at least one telescoping device arm member further comprises an encoder configured to measure a length of the telescoping device arm member.

9. The articulated arm coordinate measurement machine of claim 1, further comprising a trackable device configured to facilitate measurement of the location of the articulated arm coordinate measurement machine in space.

10. The articulated arm coordinate measurement machine of claim 9, wherein the trackable device is disposed at an end of the arm opposite the at least one coordinate acquisition member.

11. An articulated arm coordinate measurement machine system comprising the articulated arm coordinate measurement machine of claim 9, and further comprising a stationary tracking device configured to measure the location of the articulated arm coordinate measurement machine in space.

12. The articulated arm coordinate measurement machine system of claim 11, wherein the tracking device comprises an optical tracker.

13. The articulated arm coordinate measurement machine system of claim 11, wherein the tracking device comprises a laser tracker.

14. The articulated arm coordinate measurement machine system of claim 11, wherein the tracking device comprises a plurality of cameras.

15. An articulated arm coordinate measurement machine system comprising the articulated arm coordinate measurement machine of claim 1, and further comprising one or more nesting members configured to releasably attach at least one of the coordinate acquisition members.

16. An articulated arm coordinate measurement machine system comprising the articulated arm coordinate measurement machine of claim 1, and further comprising a heads-up display in operative communication with the articulated arm coordinate measurement machine and configured to display information related to coordinates measured by the articulated arm coordinate measurement machine to a user.

17. An articulated arm coordinate measurement machine system comprising the articulated arm coordinate measurement machine of claim 1, the articulated arm coordinate measurement machine further comprising a docking portion configured to form a connection to a modular feature pack, the system further comprising a plurality of modular feature packs configured to electronically connect to the articulated arm coordinate measurement machine and provide additional electronic functionality.

18. A method for measuring one or more points comprising:
   aligning arm members of an articulated arm coordinate measurement machine with at least one arm of a single person; and
   measuring one or more objects with the articulated arm coordinate measurement machine while arm members of the articulated arm coordinate measurement machine are aligned with the at least one arm of the single person.

19. The method of claim 18, wherein the step of aligning comprises aligning arm members of an articulated arm coordinate measurement machine with both arms of the single person.

20. The method of claim 18, wherein the step of measuring one or more objects comprises measuring a distance between two points on the one or more objects with a single measurement.

21. The method of claim 18, further comprising attaching a first end of the articulated arm coordinate measurement machine to a first nesting device.

22. The method of claim 21, further comprising:
   measuring a first unique position relative to the first nesting device with a second end of the articulated arm coordinate measurement machine while the first end is attached to the first nesting device;
   attaching the a second end of the articulated arm coordinate measurement machine to a second nesting device while the first end is attached to the first nesting device to measure the position of the first and second nesting devices relative to each other;
   removing the first end from the first nesting device; and
   measuring a second unique position relative to the second nesting device with the first end while the second end is attached to the second nesting device.

23. The method of claim 18, further comprising tracking a location of the articulated arm coordinate measurement machine while measuring one or more objects with the articulated arm coordinate measurement machine, and while the arm members of the articulated arm coordinate measurement machine are aligned with at least one arm of the single person.

\* \* \* \* \*

UNITED STATES PATENT AND TRADEMARK OFFICE
CERTIFICATE OF CORRECTION

PATENT NO. : 9,803,967 B2  
APPLICATION NO. : 14/860182  
DATED : October 31, 2017  
INVENTOR(S) : Hogar Tait et al.

Page 1 of 1

It is certified that error appears in the above-identified patent and that said Letters Patent is hereby corrected as shown below:

In the Drawings

Sheet 14 of 14 (FIG. 12) at Line 6 (approx.), Change "Acuisition" to --Acquisition--.

In the Specification

In Column 11 at Line 10, Change "de" to --be--

In the Claims

In Column 16 at Line 9 (approx.), In Claim 22, change "the a" to --the--.

Signed and Sealed this  
Twentieth Day of March, 2018

Andrei Iancu  
*Director of the United States Patent and Trademark Office*